(12) United States Patent
Léonard

(10) Patent No.: US 11,928,398 B2
(45) Date of Patent: Mar. 12, 2024

(54) RECONSTRUCTION OF A TOPOLOGY OF AN ELECTRICAL DISTRIBUTION NETWORK

(71) Applicant: HYDRO-QUÉBEC, Quebec (CA)

(72) Inventor: François Léonard, Quebec (CA)

(73) Assignee: HYDRO-QUÉBEC, Quebec (CA)

( * ) Notice: Subject to any disclaimer, the term of this patent is extended or adjusted under 35 U.S.C. 154(b) by 552 days.

(21) Appl. No.: 17/280,204

(22) PCT Filed: Oct. 10, 2019

(86) PCT No.: PCT/CA2019/051446
§ 371 (c)(1),
(2) Date: Mar. 26, 2021

(87) PCT Pub. No.: WO2020/077443
PCT Pub. Date: Apr. 23, 2020

(65) Prior Publication Data
US 2022/0035963 A1    Feb. 3, 2022

(30) Foreign Application Priority Data

Oct. 16, 2018   (CA) .................................. CA 3020950

(51) Int. Cl.
*G06F 30/18* (2020.01)
*H02J 13/00* (2006.01)
(Continued)

(52) U.S. Cl.
CPC ........ *G06F 30/18* (2020.01); *H02J 13/00002* (2020.01); *G06F 2111/10* (2020.01); *G06F 2113/04* (2020.01); *H02J 2203/20* (2020.01)

(58) Field of Classification Search
CPC .. G06F 30/18; G06F 2113/04; G06F 2111/10; H02J 13/00002; H02J 2203/20
(Continued)

(56) References Cited

U.S. PATENT DOCUMENTS 9,287,713 B2   3/2016   Sharon et al.
9,835,662 B2  12/2017   Driscoll et al.
(Continued)

FOREIGN PATENT DOCUMENTS

EP            2677619 A1 * 12/2013 ............... H02J 3/00
WO    WO 2012/045498 A1    4/2012
(Continued)

OTHER PUBLICATIONS

Saverio Bolognani, et al., "Identification of power distribution network topology via voltage correlation analysis," 52$^{nd}$ IEEE Conference on Decision and Control, Dec. 10-13, 2-13., Florence, Italy.

(Continued)

*Primary Examiner* — Andre Pierre Louis
(74) *Attorney, Agent, or Firm* — Muirhead and Saturnelli, LLC

(57) ABSTRACT

The disclosed method reconstructs a topology of an electrical distribution network. An ohmic matrix model is generated as a function of consumption measurements provided by smart meters in the network. A tree table of nodes to which the smart meters are connected is defined. A branch in exploration is defined in the table and the nodes of the branch meeting preestablished relations are entered in the table as a function of connection values derived from resistive quantities in the matrix model. One of the relations determines a junction of the branch in exploration with a branch already explored connectable to a root to which a distribution transformer of the distribution network is connected. The topology is reconstructed by iteratively proceeding with sequences of decreasing values derived from the resistive quantities.

15 Claims, 12 Drawing Sheets

(51) Int. Cl.
　　　*G06F 111/10*　　　(2020.01)
　　　*G06F 113/04*　　　(2020.01)
(58) Field of Classification Search
　　　USPC .......................................................... 703/18
　　　See application file for complete search history.

(56) References Cited

U.S. PATENT DOCUMENTS

| | | |
|---|---|---|
| 9,924,242 B2 | 3/2018 | Wyk |
| 2012/0185106 A1* | 7/2012 | Ghosh .................... G06Q 10/04 700/291 |

FOREIGN PATENT DOCUMENTS

| | | | | |
|---|---|---|---|---|
| WO | WO 2014/185921 A1 | 11/2014 | | |
| WO | WO-2014185921 A1 * | 11/2014 | ........... | G05B 19/058 |
| WO | WO 2018/010028 A1 | 1/2018 | | |

OTHER PUBLICATIONS

Yizheng Liao, et al., "Distribution Grid Topology Reconstruction: An Information Theoretic Approach," North American Power Symposium (NAPS), Oct. 4-6, 2015.

* cited by examiner

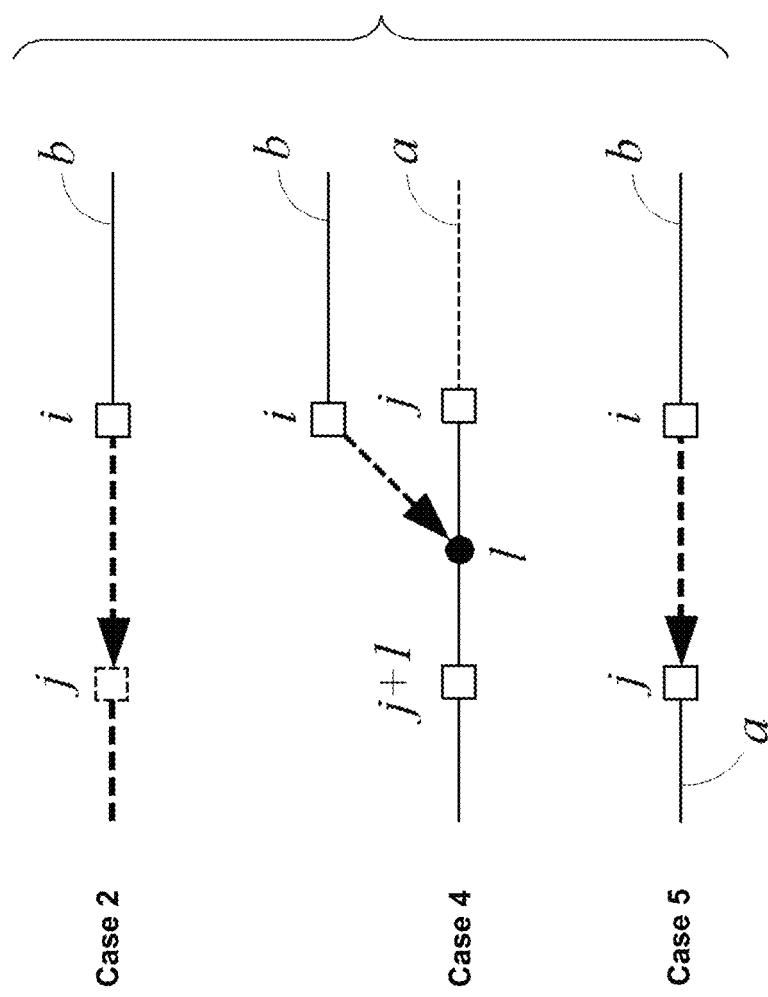

RECONSTRUCTION OF A TOPOLOGY OF AN ELECTRICAL DISTRIBUTION NETWORK

FIELD OF THE INVENTION

The invention relates to a computer-implemented method for reconstructing a topology of an electrical distribution network having nodes to which smart meters are connected. The invention also relates to a system and a tangible and non-transitory computer program product executing the method.

CONTEXT

The topology of an electrical distribution network is useful for efficiently managing an electrical network and its development. However, errors in the topology data may ruin the efforts for efficiently managing the network, especially since the networks are modernized with smart meters and increasingly subject to dynamic changes of equipment and configurations.

There are certain techniques for attempting to model an electrical distribution network. For example, U.S. Pat. No. 9,287,713 (Sharon et al.) proposes a statistical technique for estimating the state of switching devices such as circuit breakers, insulation switches and fuses in distribution networks. U.S. Pat. No. 9,924,242 (Van Wyk) proposes a technique for determining a topology of a distribution network based on relationships or correlations of information between a given node and a plurality of potential nodes that are taken into account in the determination of the topology. The determined topology may be used to detect frauds and losses that may occur in the distribution network on a regular basis or upon request. WO application 2014/185921 (Marinakis et al.) proposes a technique for allocating meters to transformers. U.S. Pat. No. 9,835,662 (Driscoll et al.) proposes a technique for determining connectivity of an electrical network using information related to zero-crossings of voltages measured by meters.

The publication entitled "Identification of power distribution network topology via voltage correlation analysis", Saverio Bolognani et al., 52nd IEEE Conference on Decision and Control, 10-13 Dec. 2013, Florence, Italy, proposes a method for reconstructing a topology of a portion of a distribution network in the form of a layout graph of nodes from a dataset of voltage measurements. The publication entitled "Distribution Grid Topology Reconstruction: An Information Theoretic Approach", Yizheng Liao et al., 2015 North American Power Symposium (NAPS), proposes a method of topology reconstruction based on information theory.

The proposed techniques are however complex and require, for some, extensive computation efforts. They are also sometimes imprecise or inefficient because of numerous variables that do not correlate due to, among other things, power theft on the distribution network, clients who have needs and equipment causing high variations of consumption measurements, faulty or failing installations such as those creating hot spots, etc. They in particular do not allow determining values of resistance, of impedance or of distance between the nodes and junctions of branches and meters of a distribution network, and thus better representing and characterizing the distribution network for its smart management. The important delays before obtaining results with the in situ inspection techniques and the reliability of the results compared to the prior art techniques mean that they cannot be used to perform a smart management of electrical distribution networks in a dynamic manner and in real-time or in a reasonably short time.

SUMMARY

According to an embodiment of the invention, there is provided a computer-implemented method for reconstructing a topology of an electrical distribution network having nodes to which smart meters are connected, the method comprising the steps of:
(i) generating an ohmic matrix model of the distribution network as a function of consumption measurements provided by the smart meters, the ohmic matrix model having matrix terms indicative of resistive quantities between the nodes and a root to which a distribution transformer of the distribution network is connected;
(ii) defining a tree table of the nodes; and
(iii) by sequences of decreasing values derived from the resistive quantities of the ohmic matrix model and iteratively for the nodes to enter in the tree table:
  (a) defining a new branch as branch in exploration in the tree table;
  (b) entering the node having the highest resistive quantity as terminal node of the branch in exploration in the tree table; and
  (c) entering in the tree table, in successive upstream positions from one another towards the root, all the nodes other than the terminal node meeting preestablished decision criteria as a function of connection values derived from the resistive quantities and, as other nodes are progressively entered for the branch in exploration, with said other nodes, one of the preestablished decision criteria determining a junction of a last node entered in the tree table with a branch already explored depending on whether the resistive quantity of the last node corresponds, within a preset sensitivity margin, to a node of an explored branch or to a position between two nodes of a branch already explored, another one of the preestablished decision criteria determining a connection of the last node to the root;
the topology of the distribution network being reconstructed when all the nodes are associated with a branch in the tree table and at least one node or a junction is connected to the root.

According to other embodiments of the invention, there is provided a system and a tangible and non-transitory computer program product executing the above method.

An advantage of the invention resides in a reduction of the volume of information for describing the distribution network. From a large number of measurements is produced an ohmic matrix of dimensionality $I^2$ where I is the number of meters. From this matrix is deduced a tree of dimensionality equal to or greater than 3 I, that is 2 (I+L) for the tree table and I+L resistive position values where L is the number of junctions. The reconstruction according to the invention advantageously allows validating the topology of the distribution network and for example making corrections or changes detected with respect to a former topology of the distribution network, or following the evolution of the distribution network for a dynamic management of the electrical resources.

BRIEF DESCRIPTION OF THE DRAWINGS

A detailed description of the preferred embodiments of the invention will be given hereinbelow with reference to the following drawings:

FIG. 8 is a schematic diagram illustrating possible cases of connection of a node "i" which is a last node found on a branch in exploration when there are still nodes to be processed.

DETAILED DESCRIPTION OF THE PREFERRED EMBODIMENTS

Figure 1A:
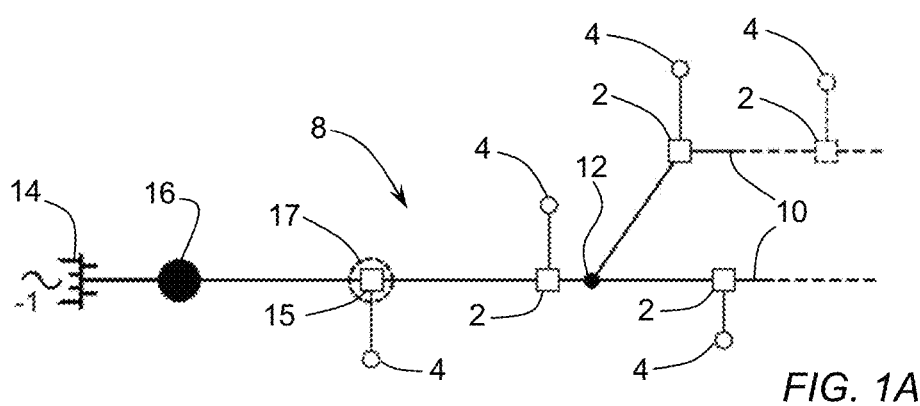
FIGS. 1A and 1B are schematic diagrams illustrating possible distribution network configurations where a root representing a generation and transmission network is at en end of a low voltage line and where a root is at an intermediary point of a low voltage line, respectively.
Figure 1B:
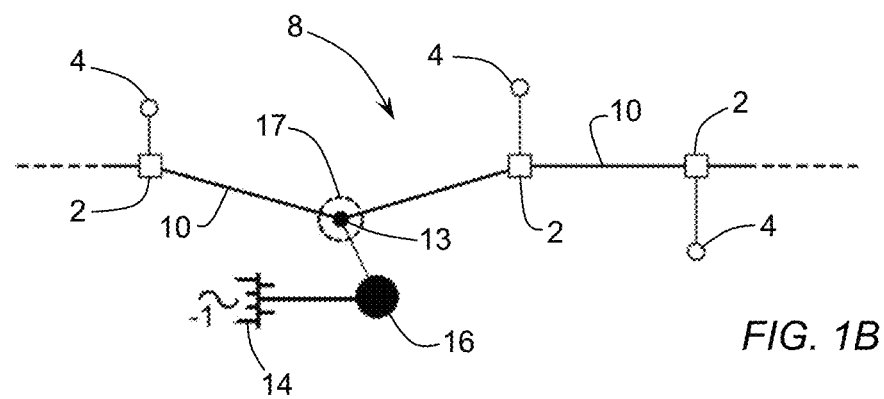

Referring to FIGS. 1A and 1B, as used in the context of this disclosure, a node 2 (illustrated in the Figures by an empty square) corresponds to a connection point of a smart meter 4 (illustrated in the Figures by an empty circle) to a low voltage branch 10 of the electrical distribution network 8. A branch 10 is made of a contiguous series of nodes 2 with their respectively associated connections. The branches 10 are interconnected by junctions 12 (illustrated in the Figures by small black disks). The method according to the invention allows reconstructing a topology of a distribution network 8 forming a tree having a root 14 formed by a generation and transmission network upstream from a distribution transformer 16 (illustrated in the Figures by a large black disk) powering consumers of the distribution network. The root may be represented by the index −1 (as shown) for its processing in the method according to the invention as described hereinafter. Another index may be used if desired. In the case of a transformer 16 connected to an end of a line of a distribution network 8 as shown in FIG. 1A, the connection point 17 to the transformer 16 may be merged with the node 15 of the meter the closest to the transformer 16. In the case of a transformer 16 connected to an intermediate point of a line as shown in FIG. 1B, the connection point 17 to the transformer 16 may be merged with the intermediate point of the line coinciding with a junction 13. The connection point 17 to the transformer 16 may be considered as a beginning of a trunk connecting the tree of the distribution network 8 to the root 14. More than two line connections at a same connection point to the transformer 16 may be assimilated to the representation of FIG. 1B where other branches (not shown) would then be connected to the junction 13. A cable segment corresponds to any cable portion having an end connected to a junction 12, 13, a node 2, 15, the root 14 or a meter 4.

Figure 2:
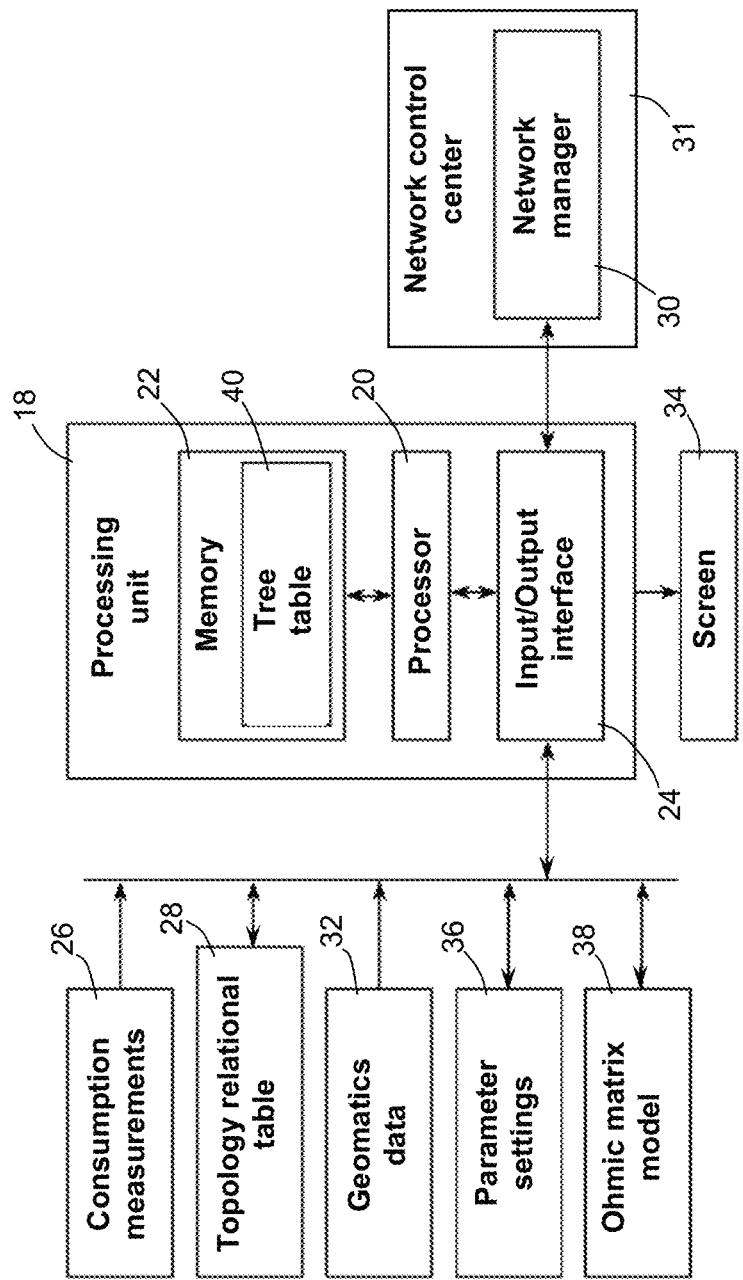
FIG. 2 is a schematic diagram illustrating an embodiment of system configured for the implementation of the method according to the invention.

Referring to FIG. 2, a system configured for the computer-implementation of the method according to the invention is shown. The system comprises a processing unit 18 having a processor 20 coupled to a memory 22 and an input/output interface 24 allowing communicating with the processing unit 18. In particular, the interface 24 allows retrieving the consumption measurements 26 of the smart meters 4, the topology relational table 28 of the distribution network 8 to reconstruct, selected by a user or automatically by a network manager 30, geomatics data 32 allowing displaying a geographic map or plan of the distribution network 8 on a screen 34, execution settings and parameters 36 of the method, and ohmic matrix model data 38 already produced if any. The network manager 30 may be located in a network control center 31 or another installation that may for example access and manage the consumption measurements 26, the topology relational table 28, the geomatics data 32, the setting data of the parameters 36, the ohmic matrix model 38 and other possible data, and which may also for example remotely control equipment of the electrical network which includes the distribution network 8 for responding to the electricity needs or for ensuring the safe operation of the electrical network. Other system configurations may be suitable for executing the method, for example a distributed or cloud-based system, with manual or automatic mechanisms for updating, modifying or correcting topology data of the distribution networks analyzed with the method according to the invention.

The method according to the invention uses the consumption measurements provided by the smart meters 4 so as to generate an ohmic matrix model of the distribution network 8 as a function of the consumption measurements. The method described in the application WO 2018/010028 (Léonard) may advantageously be used for this purpose. The resulting ohmic matrix model (hereinafter also referred to as ohmic matrix) has matrix terms indicative of resistive quantities between the nodes 2 and the root 14 to which the distribution transformer 16 of the distribution network 8 is connected.

Referring again to FIGS. 1A and 1B, the method according to the invention proceeds with an exploration of the branches 10 of the tree of the distribution network 8 by beginning at an end of a branch and by progressing towards the root 14. For a given position in the tree, upstream is in the direction of the root 14 while downstream is towards an end of a branch 10. In search of a new branch 10, the first selected node 2 is the one first having a greater resistivity in its non-diagonal terms of the ohmic matrix and then in its diagonal term (auto-term). The highest non-diagonal term relating to two meters 4, a choice of one of the two meters 4 may be made to determine a single first node 2. The first selected node 2 forms a terminal node of the branch 10 in exploration. The next nodes 2 in the branch 10 are selected by decreasing order of resistivity of their diagonal terms. The exploration process of a branch 10 ends when the branch 10 is connected to an existing (already explored) branch 10 or to the root 14. The process is finished when there are no more node 2 (or meter 4) to be processed. For practical reasons of implementation of the method, an index representing the root 14 may be set to −1 while the indices of the nodes 2 may be defined by positive integer numbers determined at the beginning of the process by their position in the initial ohmic matrix. The method thus links the physical elements of the distribution network 8 to the terms like the meters 4, the nodes 2, the branches 10 of a line 6, the junctions 12, 13, the distribution transformer 16 and the root 14 used to describe the tree of the distribution network 8.

Thus, when the ohmic matrix model of the distribution network is generated, the method according to the invention may proceed by defining a tree table 40 (as shown in FIG. 2) of the nodes 2. By sequences of decreasing values derived from the resistive quantities of the ohmic matrix model and iteratively for the nodes 2 to enter in the tree table 40, the method may then proceed (a) by defining a new branch 10 as branch in exploration in the tree table 40, (b) by entering the node 2 having the highest resistive quantity as terminal node of the branch in exploration in the tree table 40, and (c) by entering in the tree table 40, in successive upstream positions from one another towards the root 14, all the nodes 2 other than the terminal node meeting preestablished decision criteria as a function of the values derived from the resistive quantities and, as other nodes 2 are entered for the branch in exploration, with these other nodes 2, one of the preestablished decision criteria determining a junction 12 of the last node 2 entered in the tree table 40 with a branch 10 already explored depending on whether the resistive quantity of the last node 2 corresponds, within a preset sensitivity margin e.g. as setting/parameter 36 (shown in FIG. 2), to a node 2 of an explored branch 10 or to a position between two nodes 2 of a branch 10 already explored, another one of the preestablished decision criteria determining a connection of the last node 2 to the root 14. The topology of the distribution network 8 is reconstructed when all the nodes are associated with a branch 10 in the tree table 40 and at least one node 2 or a junction 12, 13 is connected to the root 14. The preestablished decision criteria usable by the method are described with more details hereinafter.

Figure 3:
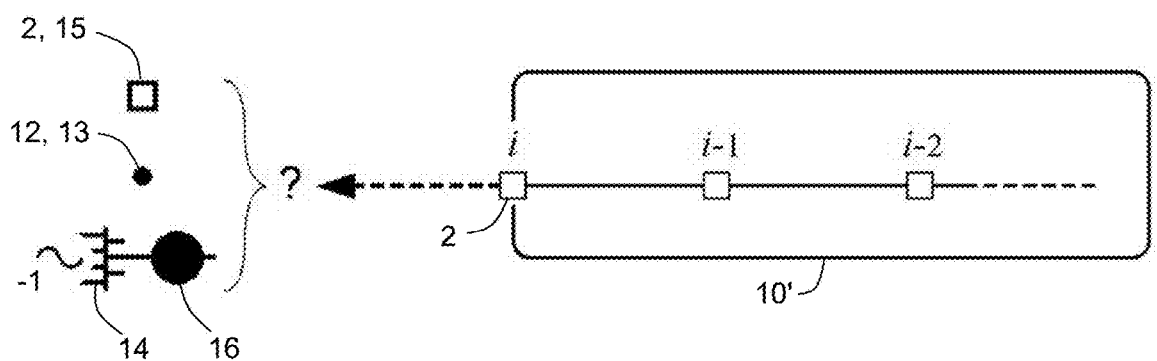
FIG. 3 is a schematic diagram illustrating a branch already explored and a branch in exploration with possibilities of connection of a last node found.

Referring to FIG. 3, an example of exploration of a branch is shown. From a node "i" selected during the exploration of the branch (initially a terminal node), a portion 10' already explored of the branch connected to the node "i" and three different possibilities of connection of the selected node "i" in progression towards the root 14 are considered, so that the node "i" is connected to a node of the branch even closer to the root 14, to a junction 12, 13 with another branch already explored, or to the root 14. In FIG. 3, the branch shown in example comprises three nodes or more (dotted line). In the case where "i" would correspond to a terminal node, this one would then be the only node of the branch and the nodes "i-1", "i-2" and any following node would be nonexistent.

In the following, branches "a", "b", "c" and "d", node indices "i", "j" and "k", and a junction index "l" are used to facilitate understanding.

Figure 4:
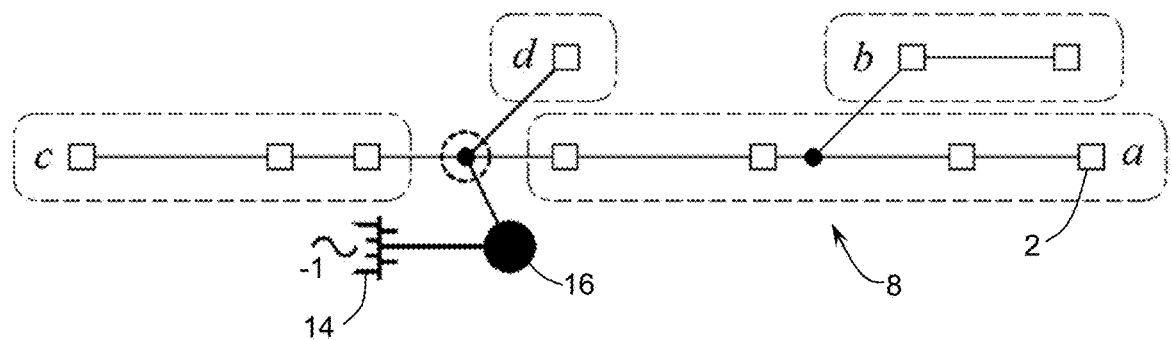
FIG. 4 is a schematic diagram illustrating an example of distribution network tree having four branches explored in the order a-b-c-d.

Referring to FIG. 4, an example of tree with branches a-b-c-d representing the topology of a distribution network 8 is shown. According to an embodiment of the method, the branches are explored in the order of the terminal nodes furthest from the root 14, according to the resistive values in the ohmic matrix, so that branch a is the first explored, then branch b followed by branch c to end with branch d.

Figure 5:
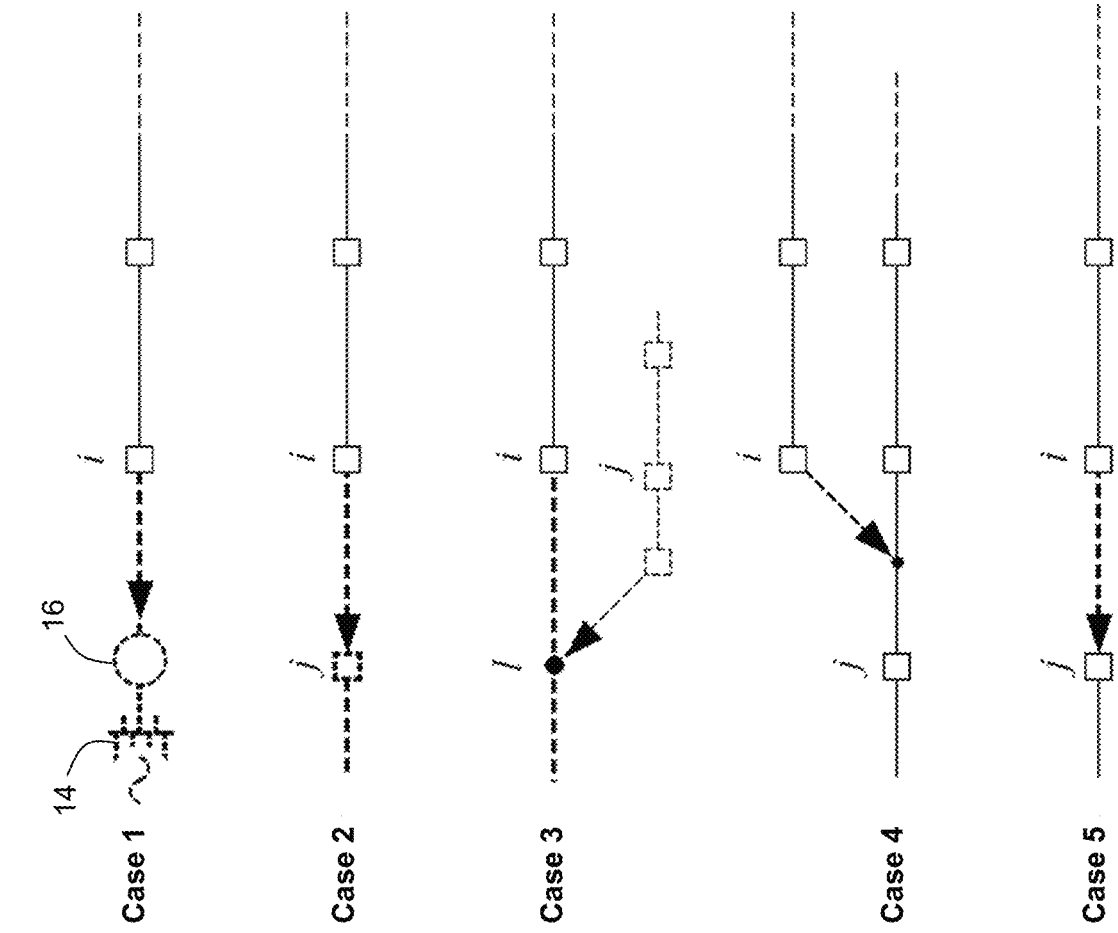
FIG. 5 is a schematic diagram illustrating five cases of connections of a node "i" formed by a last node found on a branch in exploration.

Referring to FIG. 5, a connection to be considered for a last node "i" found on a branch being explored may be determined according to a set of cases as follows:

Case 1 is a connection of node "i" to the root 14 through the transformer 16.

Case 2 is a connection of node "i" to the next node "j" towards the root.

Case 3 is a connection of node "i" to a junction "l" with another branch that will be created between the branch in exploration and a branch not yet explored, branch that will afterwards be connected upstream from the node "i".

Case 4 is a connection of node "i" to a junction "l" with an existing branch.

Case 5 is a connection of node "i" to a terminal node "j" of an existing branch.

Among these cases, cases 1, 2 and 4 are possible and if one of them is validated, it is applied. Case 3 pertains to a connection action to a junction with another branch yet unexplored and will be proven during the exploration of this other branch. Case 3 is thus not considered at this step since a decision about this possibility is deferred to a later step. Case 5 cannot occur if the method proceeds from the most remote terminal nodes to progress towards the root. Case 5 may however be used to detect a process error in the implementation of the method.

Figure 6:
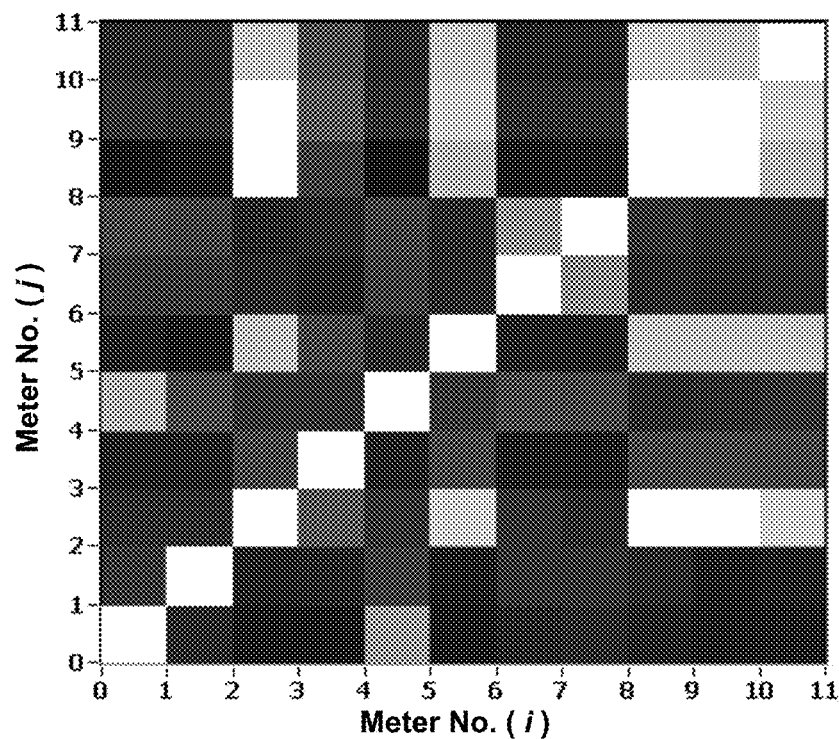
FIG. 6 is a graphics rendering of an example of ohmic matrix model for a distribution network having 11 meters, where a black shade corresponds to a resistive quantity near 0Ω and a white shade corresponds to a resistive quantity exceeding 50 mΩ.

Referring to FIG. 6, an example of ohmic matrix model (also called ohmic matrix or transfer function matrix) is shown. The model covers a distribution network having 11 meters. Black represents a value close to 0Ω while white represents a value exceeding 50 mΩ. As explained in the application WO 2018/010028 (Léonard), the ohmic matrix $$H = \begin{bmatrix} \ddots & \vdots & \iddots \\ \cdots & H_{i,j} & \cdots \\ \iddots & \vdots & \ddots \end{bmatrix} = \begin{bmatrix} r_{1,1} + h_1 & r_{1,2} & \cdots & r_{1,j} & \cdots & r_{1,l} \\ r_{2,1} & r_{2,2} + h_2 & \cdots & r_{2,j} & \cdots & r_{2,l} \\ \vdots & \vdots & \ddots & \vdots & \vdots & \vdots \\ r_{i,1} & r_{i,2} & \cdots & r_{i,i} + h_i & \cdots & r_{i,l} \\ \vdots & \vdots & \vdots & \vdots & \ddots & \vdots \\ r_{l,1} & r_{l,2} & \cdots & r_{l,j} & \cdots & r_{l,l} + h_l \end{bmatrix} \quad (1)$$

is estimated from the voltage and current measurements of the meters 4 (as shown in FIGS. 1A and 1B), for example from the voltage and current derivatives such as $$H_{i,j} = -\frac{\sum_{m=1}^{M} \partial v_{i,m} \cdot \partial c_{j,m}}{\sum_{m=1}^{M} \partial v_{j,m}^2} \quad \text{(index ``i'': voltage variation, index ``j'': current variation)} \quad (2)$$

and has Ohms (Ω) as unit. In FIG. 6, a row of index "j" of the matrix expresses the influence that a current of the meter "j" has on the voltage of the meters while a column of index "i" expresses the influence that the currents of the meters has on the voltage of the meter "i", these influences being expressed in unit of Ohms (Ω). In the formulation of equation 1, if a value $h_i$ directly corresponds to the connection resistance of the meter "i" with the low voltage line, on the other hand the values $r_{i,j}$ correspond to a mix of the line segment resistance values. The method according to the invention may advantageously determine the topology while finding the resistance values of each line segment of the distribution network from this mix.

The method according to the invention is also usable for any value or a fictive value of the connection point to the transformer 16 (as shown in FIGS. 1A and 1B), in which case there is a translation of the transfer function matrix by the addition or the subtraction of a same resistive term for all the terms of the matrix.

The auto-terms $D_i = r_{i,j} + h_i$ or diagonal terms, and the inter-terms $E_{i,j} = r_{i,j}$ or extra-diagonal terms, may be divided so that the transfer function is the sum of the matrices D and E such that $$H = D + E = \begin{bmatrix} r_{1,1}+h_1 & & & & & \\ & r_{2,2}+h_2 & & & 0 & \\ & & \ddots & & & \\ & & & r_{i,i}+h_i & & \\ & 0 & & & \ddots & \\ & & & & & r_{I,I}+h_I \end{bmatrix} + \begin{bmatrix} 0 & r_{1,2} & \cdots & r_{1,j} & \cdots & r_{1,I} \\ r_{2,1} & 0 & \cdots & r_{2,j} & \cdots & r_{2,I} \\ \vdots & \vdots & \ddots & \vdots & \vdots & \vdots \\ r_{i,1} & r_{i,2} & \cdots & 0 & \cdots & r_{i,I} \\ \vdots & \vdots & \vdots & \vdots & \ddots & \vdots \\ r_{I,1} & r_{I,2} & \cdots & r_{I,j} & \cdots & 0 \end{bmatrix} \quad (3)$$

The resistive values $r_{i,j}$ and $h_i$ correspond to very different cable gauges because respectively, the first one is a line cable and the second one is a connection cable of the meter to the network. The linear resistivity quantities of the cables (Ω/m) will be used later by the method in order to estimate distances and to produce a topological plot representative of the transfer function matrix. The transfer function matrix deviates from a symmetrical matrix ($r_{i,j} = r_{j,i}$) with, among other things, a contribution (which may cause an increase as well as a decrease) of the inter-correlation between the currents of the meters (similar consumption profiles) and especially with a presence of electrical non-compliances (ENC). Correction means of the matrix are discussed hereinafter. At this stage, adding the matrix with its transposed, this sum being divided by two, gives a symmetrical matrix which usually provides better results. A linear compromise between the original matrix and the symmetrized matrix may also be generated and used. In ENC cases where there is a connection problem of a meter either in its base or further up to its connection on the line, it is the column "i", that is $r_{i,j}$ with "j" variable, corresponding to the faulty meter, which displays erroneous terms. Conversely, in ENC cases where there is a bypass so that the measured current is wrong, it is the row "j", that is $r_{i,j}$ with "i" variable, corresponding to the defective meter, which displays erroneous terms. In the presence of one of these two types of defect, it is possible to choose the inter-terms that are not erroneous for the determination of the topology while for the auto-term, this one may not be corrected, causing a significant deviation of the value of the connection resistance. In the following, the row-column indices may be interchanged without consequences for a symmetrical matrix and with a possibly negative consequence for a notably non-symmetrical matrix.

Figure 7A:
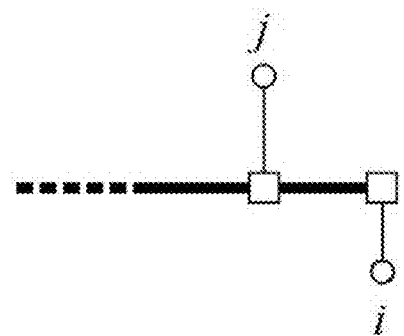
FIGS. 7A, 7B, 7C and 7D are schematic diagrams illustrating respective possibilities of connection of a terminal node "i" and of a co-terminal node "j" of a low voltage line.
Figure 7B:
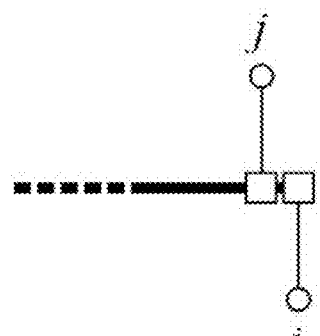
Figure 7C:
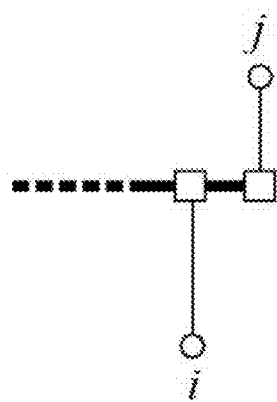
Figure 7D:
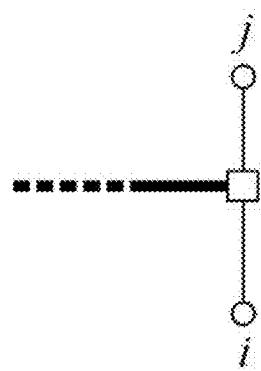

The information contained in the matrix D will be used later to determine a connection length between a meter and its connection point on the line. The information contained in the matrix E allows generating almost the entire tree of the distribution network. An unknown tree portion is located at the end of each branch. For example, in the simple case of a branch comprising a single meter, that is an isolated meter connected to the connection point of the transformer, it will not be possible to determine which portion corresponds to a line cable and which one corresponds to a connection cable. More complex, all the branches comprising two or more meters will have two nodes alike at their termination. As shown in FIGS. 7A, 7B and 7C, where $D_i > D_j$, it is impossible to distinguish which meter is connected the farthest on the line and which portion corresponds to a line cable and which one corresponds to a connection cable for these two connections. In FIGS. 7A, 7B, 7C and 7D, the low voltage line cable is in bold line while the two line connections are in thinner lines. For identical resistance values, an infinite number of length ratio combinations between the line cable and the connection cable is possible. In that case, the node which exhibits the highest resistivity inter-term (when it listens the voltages (or voltage variations) generated by the currents (or current variations) of the other meter) is considered as terminal node i, the other node being then considered as co-terminal node j. The terminal node and the co-terminal node share the same connection point on the line, that is the junction point between both meters as shown in FIG. 7D, and are represented by a same set of resistance values in the matrix H.

For example, let the nodes "i" and "j" respectively be a terminal node and a co-terminal node, then $$R_i = R_j = \frac{r_{i,j} + r_{j,i}}{2} \quad (4)$$

is the resistive position of their common connection point on the line with respect to the root. This computation choice of $R_i$ most often gives an underestimated length for the low voltage line. Explicitly, the connection cable replaces the line cable for one of the two meters. The connection resistances are then expressed $$h_i = D_i - R_i \text{ and } h_j = D_j - R_j \quad (5)$$

with $R_i = R_j$ as expressed in equation 4.

According to an embodiment, the method begins with a procedure where there is selection, among the unprocessed nodes, of the node having the most resistive extra-diagonal term according to the matrix E. This node is considered as terminal node. Initially, all the nodes are unprocessed and during the process, the group of unprocessed nodes progressively decreases in population with the exploration of branches. The procedure ends when there are no more nodes to process.

A terminal node is a starting point for the exploration of a branch towards the root. For the first node processed by the process, there is no existing branch yet and only cases 1 and 2 shown in FIG. 5 are possible connections. However, in an implementation of the method, the same procedure, thus the same decision tree involving cases 1, 2 and 4 may be applied for each new terminal node.

Let the exploration of the upstream branch "b" towards the root where the node "i" is the last node explored and connected to the branch such as $i \in B_b$. Let $$ETB_{b,j} = \frac{1}{\sum_{k \in B_b} 1} \cdot \sum_{k \in B_b} r_{k,j}, k \neq j \quad (6)$$

the average of the extra-diagonal terms on the column of the node "j" coinciding with the nodes found in the branch $B_b$ being explored, that is the nodes belonging to the set $B_b$ and located downstream from the node "i" and including the node "i". This average $ETB_{b,j}$ of the extra-diagonal terms may also be carried out on the terms according to the row of the node "j" or a combination of the terms on the row and column of the node "j". At the step of the search of the candidate for testing the different cases among the cases 2 and 4, the group of the tested nodes "j" excludes the nodes that already belong to the branch in exploration and excludes those previously processed and dismissed as candidate for the connection to node "i". In this group, the candidate exhibiting the maximum value of $ETB_{b,j}$ will be the one selected to be validated as case 2 or 4, that is respectively a node "j" connecting to the node "i" resulting in the allocation $j \in B_b$ or a node "j" belonging to another branch and which will have the branch of "i" joined downstream on its branch between itself and the next downstream node on its branch. Except implementation error, $ETB_{b,j} < ETB_{b,j}$.

If the candidate is not retained for case 2 or 4, the selection of another candidate is restarted if there are still nodes to be processed. If there is no node left to be processed, then it is case 1 that applies and the exploration process of the branch ends at the root (Case 1 validated).

Referring to FIG. 8, there is shown how the method may validate if a selected candidate corresponds to Case 2 or Case 4, depending on whether the candidate "j" found is or is not allocated to an existing branch (Case 1 is excluded since a node is candidate).

Figure 9:
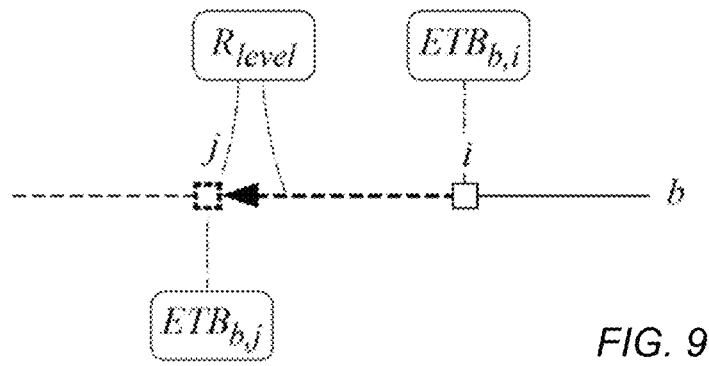
FIG. 9 is a schematic diagram illustrating decision criteria for a validation of case 2 in FIG. 5.

FIG. 9 shows the details regarding the decision criteria for validating Case 2. The values $0.5 \cdot (r_{j,i} + r_{i,j})$, $r_{j,i}$, $r_{i,j}$, $ETB_{b,j}$, and $\max\{r_{j,l}\}$ are all very close if Case 2 is validated. In the ongoing validation process of the candidate, Rlevel represents a threshold value which may be equal to the maximum value observed for the inter-terms used in the computation of $ETB_{b,j}$ such as $$Rlevel_j = \max\{r_{k,j}\}_{k \in B_b, k \neq j} \quad (7)$$

preferably used to reduce the probability of catching a node belonging to another branch. The value $r_{k,j}$ is less modified than $r_{j,k}$ when there is theft (a bypass increases the apparent resistance $r_{j,k}$) at the validated meter "k".

The node "j" is the continuation of the branch explored towards the root (Case 2 validated) if $$Rlevel_j \geq \max\{r_{r,j}\}_{k \notin B_b} - \alpha \cdot R_S \quad (8)$$

where $\alpha \cdot R_S$ is a resistive term of small scale representative of an estimation error of the transfer function matrix and explained hereinafter. Typically, this error corresponds to the resistance of 1 to 5 meters of line conductor. This is the expected resolution for locating junctions on the estimated network, and may be used to define the desired sensitivity margin. The multiplicative coefficient $0.5 < \alpha < 4$ is preferably set close to unity.

When expression 8 is true, it is because one of its inter-terms in common with the branch "b" being explored is higher than all its inter-terms with the other existing branches or the branches not yet explored. Case 2 is validated and the resistive position of the node "j" with respect to the root is then $ETB_{b,j}$.

Figure 10A:
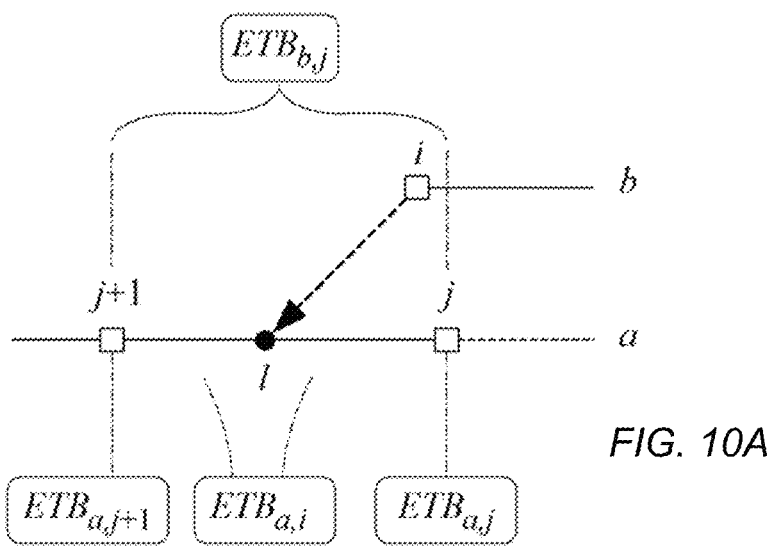
FIGS. 10A and 10B are schematic diagrams illustrating decision criteria for a validation of case 4 in FIG. 5.
Figure 10B:
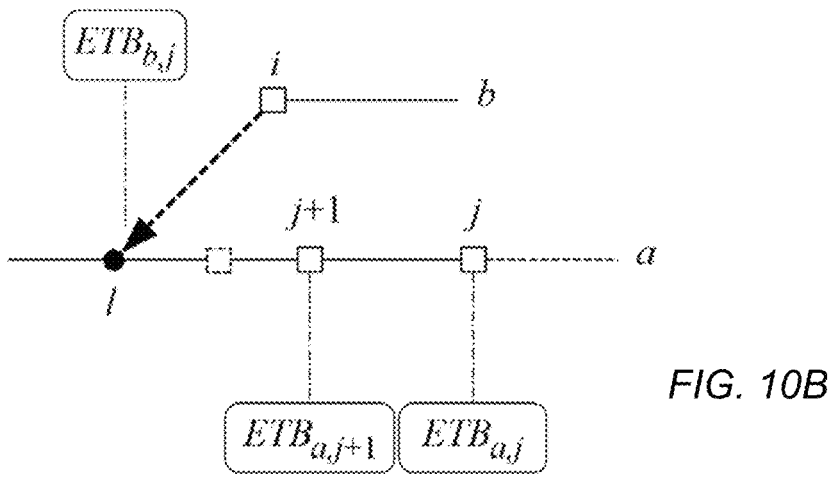

Referring to FIGS. 10A and 10B, Case 4 appears as a possible solution associated to the creation of a junction close to a candidate node belonging to a branch already explored. The branch being explored is designated by "b" and the existing branch by "a". The candidate is the one having the maximum value $ETB_{b,j}$ observed among the nodes that do not belong to those explored in the branch "b" and that have not been already processed as candidate for connection to the node "i". The junction is considered between the node "j" and the node "j+1" on the branch "a". If this maximum value $ETB_{b,j}$ is greater than the resistive position of the node "j" defined by $ETB_{a,j}$ such as $$ETB_{b,j} > ETB_{a,j} \quad (9)$$

there is an inconsistency problem that may be explained by an implementation error of the exploration process. This case corresponds to a junction downstream of the node "j" or on the node "j" if this node is a terminal node (Case 5). However, in the first case, the maximum value $ETB_{b,j}$ should be smaller than the maximum value $ETB_{b,j-1}$ observed on the preceding node of the branch "a" which has been candidate in a previous step of the exploration process. If the condition in equation 9 is verified, an error may be reported for example on the screen 34 (shown in FIG. 2). If $$ETB_{b,j} \leq ETB_{a,j} \quad (10)$$

there is maybe a junction to create (FIGS. 10A and 10B). This junction to be created on the branch "a" is located in the interval between the upstream node "j+1" and the node "j". If $$ETB_{b,j} > ETB_{a,j+1} \quad (11)$$

then Case 4 is validated as shown in FIG. 10A. The value $ETB_{b,j}$ corresponding to the terms of the branch "b" seen by the node "j" will be similar to the value of $ETB_{a,j}$ corresponding to the terms of the branch "a" seen by "i". The merging of these resistive values then approximately corresponds to the position of the junction "l", that is for example $$R_l = \frac{1}{\sum_{k \in B_b, k \neq j} 1 + \sum_{k \in B_a, k \neq i} 1} \left( \sum_{k \in B_b, k \neq j} r_{k,j} + \sum_{k \in B_a, k \neq i} r_{k,i} \right) \quad (12)$$

the resistance value characterizing the position of the junction "l" between the branches "b" and "a" upstream of the node "j" of the branch "a".

When equation 10 is verified while equation 11 is not verified as shown in FIG. 10B, that is $$ETB_{b,j} \leq ETB_{a,j+1} \tag{13}$$

it is because the junction is located upstream of the node "j+1". The candidate is rejected and no junction is created. The junction will be created at a later step of the process for a node on the branch "a" which will be more upstream.

The steps of the connection process of a node "i" belonging to a branch being explored may be as follows:

1. determine a next node to process in the group of nodes to be evaluated,
2. if there are no nodes left to evaluate then Case 1 is validated—connect the node "i" to the root and go to step 8, else
3. compute the value $ETB_{b,j}$ for each member of the group,
4. select a candidate node "j" that has the highest value of $ETB_{b,j}$,
5. if the node "j" belongs to an existing branch then go to step 7, else
6. if $R_{level} \geq \max\{r_{j,l}\} - \alpha \cdot R_S$ then Case 2 is validated—the resistive position of the node "j" with respect to the root is $ETB_{b,j}$ and go to step 8, else Case 3 is validated—return to step 1.
7. if $ETB_{b,j} \leq ETB_{a,j}$ and $ETB_{b,j} > ETB_{a,j+1}$, then Case 4 is validated—create the junction "l" at the position $R_l$ and go to step 8, else, report an error in the process if $ETB_{b,j} > ETB_{a,j} + \alpha \cdot R_S$, and return to step 1.
8. connection process of the node finished.

Figure 11A:
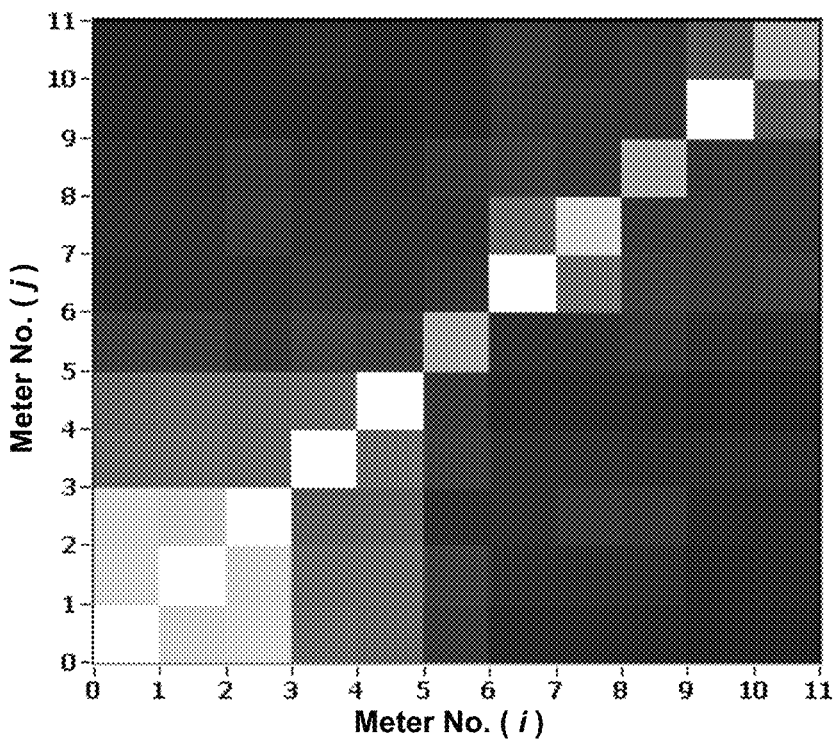
FIGS. 11A, 11B and 11C are, respectively, a graphics rendering of the example of ohmic matrix model of FIG. 6 classified in order, an exploded view of the ohmic matrix model, and a corresponding topology of distribution network.
Figure 11B:
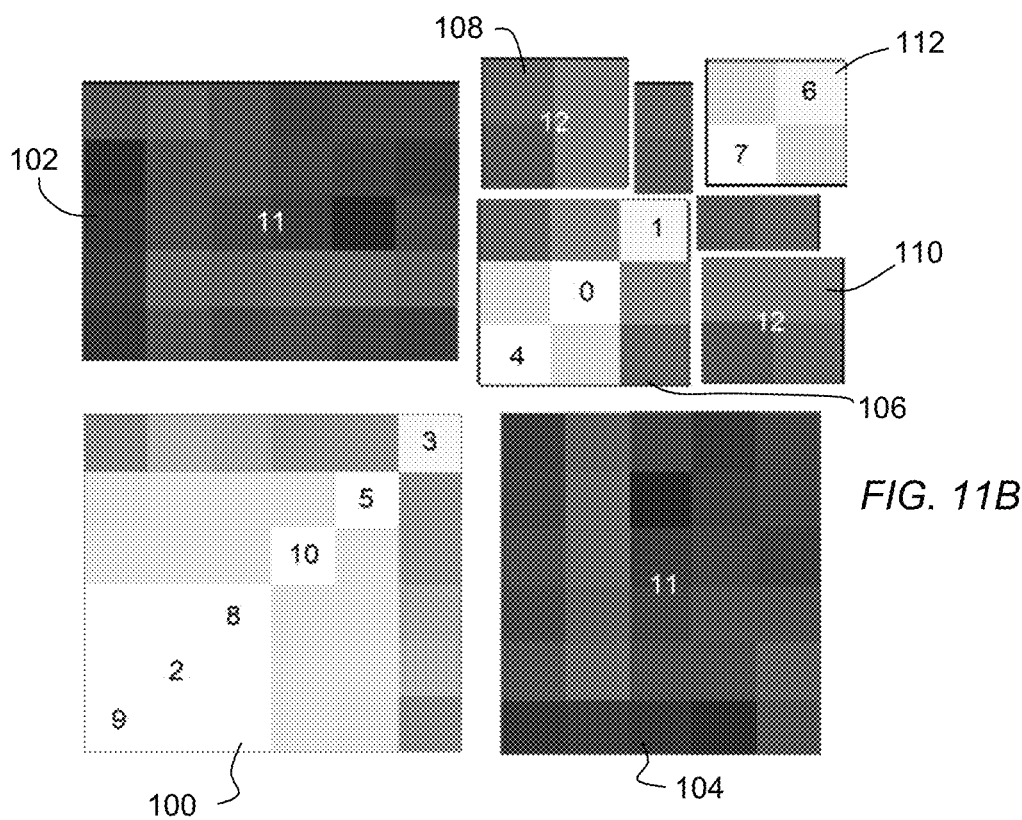

Referring to FIG. 11A, the transfer function matrix shown in FIG. 6 is classified in consecutive travelling order of the branches of the distribution network, in order to distinguish the branches and junctions as better shown in FIG. 11B which is an exploded view of the classified matrix. In FIG. 11B, the quantities 100 relate to the branch "a", the quantities 102, 104 relate to the junction "$l_1$", the quantities 106 relate to the branch "b", the quantities 108, 110 relate to the junction "$l_2$", and the quantities 112 relate to the branch "c" of the topology of the distribution network shown in FIG. 11C, reconstructed from the matrix.

According to an embodiment of the method, the most precise estimation of the position of a junction is obtained from all the inter-terms common to the nodes of the two joined branches, that is $$R_j = \frac{1}{\sum_{i \in B_a} 1 \cdot \sum_{j \in B_b} 1} \cdot \sum_{i \in B_a} \sum_{j \in B_b} r_{i,j} \tag{14}$$

On the matrix H classified in the consecutive travelling order of the different branches, these terms correspond to rectangles of different shades representative of the corresponding resistive value as shown in FIG. 11B. On an unclassified matrix H (as shown in FIG. 6), it is difficult to visually interpret the matrix because the observed terms appear scattered, discontinuous and unrelated. The classified matrix corresponds to the original matrix rearranged according to the order in which the nodes are entered in the tree table. The following Table 1 shows a correspondence table of the indices between FIGS. 6 and 11A. The indices of FIG. 6 are repeated in FIGS. 11B-C with the addition of two junction numbers.

TABLE 11

Correspondence between the indices of FIGS. 6 and 11A

| FIG. 11A | 0 | 1 | 2 | 3 | 4 | 5 | 6 | 7 | 8 | 9 | 10 |
|---|---|---|---|---|---|---|---|---|---|---|---|
| FIG. 6 | 8 | 9 | 2 | 10 | 5 | 3 | 0 | 4 | 1 | 6 | 7 |

The formulation given in equation 14 comprises the terms summed in equation 12, that is the cross terms of both nodes connecting both branches to the junction, as well as the cross terms of the other nodes of these branches. The number of considered terms being the maximum number of terms that may be considered, this formulation is more precise. The junctions, given the greater number of terms used for their estimation, often have more precise position estimations than the nodes, the node positions corresponding to the connection positions of the meters.

When two junctions appear very close, at a lesser distance, or a lower resistance than a preset threshold (sensitivity/resolution margin), these junctions may be merged into a single junction to simplify the result. It is then the inter-terms for the different combinations of cross relationships which are used to estimate the resistive position of the junction. For example, a junction $I_1$ of the three branches a-b-c in FIG. 11C has its resistive position defined by $$R_j = \frac{1}{\sum_{i \in B_a} 1 \cdot \sum_{j \in B_b} 1 + \sum_{i \in B_b} 1 \cdot \sum_{j \in B_c} 1 + \sum_{i \in B_c} 1 \cdot \sum_{j \in B_a} 1} \cdot \left( \sum_{i \in B_a} \sum_{j \in B_b} r_{i,j} + \sum_{i \in B_b} \sum_{j \in B_c} r_{i,j} + \sum_{i \in B_c} \sum_{j \in B_a} r_{i,j} \right). \tag{15}$$

The case of the final junction connecting the distribution network 8 to the transformer 16 according to FIG. 4 is a particular case to process if it is deemed useful to reach such a level of detail. Connecting the network 8 to the root 14, the position of this junction is deduced from the participation of all the nodes and, as a result, is usually the position estimated with the most precision. The resistive value equivalent to this position is the sum of the resistance upstream of the transformer 16 with the internal resistance of the transformer 16 and, typically, the resistance of two to three meters of cable connecting the network 8 to the transformer 16. For example, for a 14.4 kV-250 V split-phase network, the resistance upstream of the transformer 16 of a 3.5Ω line divided by the square of the transformation ratio will give an equivalent of 1.0 mΩ seen by the distribution network 8. The typical internal resistance of a distribution transformer on an electrical network in Quebec is of the order of 2 to 30 mΩ seen from the secondary. To this resistance is added at least two meters of 350 kcmil cable, that is 0.2 mΩ between the transformer and the nearest node or junction. The apparent resistance of the root thus exceeds 3 mΩ but may also reach 30 mΩ in the context of a rural installation for a single client. For this example, the resistive position of the junction with the root should thus be at least over 3 mΩ for a typical 250 V split-phase network. During the computation of the resistive position of the final junction, it is relevant to identify a node having a resistive position much lower than the other positions or much lower than a threshold usually set over 3 mΩ. A too low resistive position determines the presence of a meter to transformer allocation error. In an embodiment of the method, the insertion of the connection junction to the root, that is the precise determination of the distance of the junction to the root, is made after the creation of a first table describing the topology according to a step c of the exploration process of the branches described hereinafter. The steps of the creation process of a junction to the root may be as follows:
1. determine the number of branches connected to the root,
2. if only one branch is connected to the root then there is no junction to be created, go to step 3, else:
   a. construct a list of the inter-terms of the different combinations of cross relationships between the nodes of the branches to be joined,
   b. detect if there is a too low resistive position and if yes reporting the presence of a meter to transformer allocation error and removing this node from the list of the inter-terms of the different combinations of cross relationships,
   c. compute an average of these inter-terms which determines a resistive position of the junction and taking the minimum value between this average and the resistive position of the node closest to the root,
   d. allocate an index number to the junction to be created,
   e. insert the junction and its resistive position in the table describing the topology, then go to step 3,
3. process finished.

The terminal node and co-terminal node association may be added in the previous process or be done later.

The steps of the exploration process of different branches may be as follows:
a. determine the next terminal node, if there is no other nodes to be processed go to step c, else:
b. apply the connection process of a node belonging to a branch being explored and if the connection is made to the root or to a junction then go to step a, else return to step b,
c. exploration process of the branches finished,
d. if more than one node and junction connected to the root, creation of the final junction connecting the distribution network to the transformer,
e. tree generation process finished.

Figure 12:
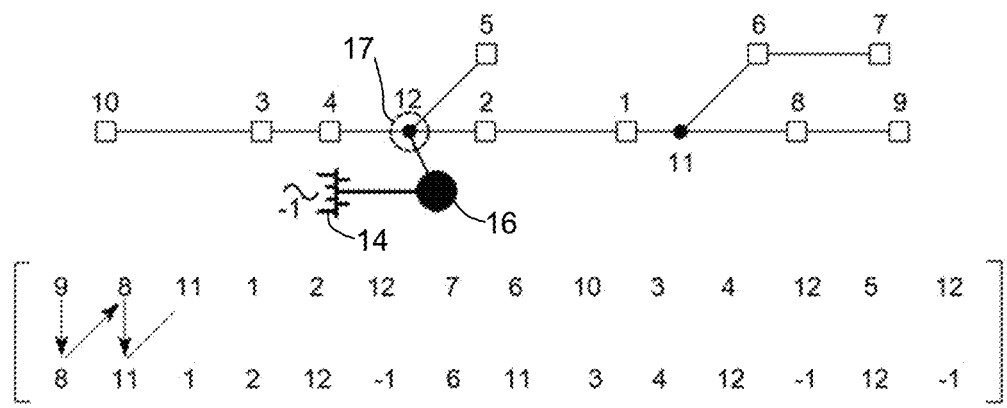
FIG. 12 is a schematic diagram illustrating an example of topology of a distribution network and a tree table describing the topology.

Referring to FIG. 12, the same topology as the one of FIG. 4 is shown, with addition of a numbering of the nodes and a corresponding topology table describing the topology of a distribution network comprising 10 nodes ("1" to "10"), two junctions ("11" and "12") and the root ("−1"). According to an embodiment, numbers that follow the sequence of node numbers are used as index for the numbers of junctions created by the process. In the example shown in FIG. 12, if a junction created has "11" as allocated index in the topology table, the node "10" then has the highest index among the nodes. A position of the junction "12" is estimated by equation 15 since it connects three branches to the root.

Certain refinements may be brought to the method according to the invention, including correction means of the ohmic matrix.

The purpose of the parameter $R_S$ is to take account of a statistical dispersion of the terms of the transfer function matrix. This dispersion, or estimation noise of the terms of the matrix, is due among other things to the non-zero inter-correlation between the currents of the different meters and the voltage variation of the medium-voltage line. Without this dispersion, the terms summed in equation 6 would all have the same magnitude. This parameter expressed in resistance has a counterpart in distance if it is divided by a linear resistance (Ω/m) of the line. An introduction of this parameter allows shifting comparison thresholds that may be used as preset sensitivity margin to take the dispersion of the terms into consideration. This parameter may be set or computed. For example the estimation $$R_S = \sqrt{\frac{1}{\left(\sum_{k \in B_a, k \neq j} 1\right) - 1} \sum_{k \in B_a, k \neq j} (r_{k,j} - ETB_{a,j})^2}\bigg|_{(\Sigma_{k \in B_a, k \neq j} 1) > 1} \quad (16)$$

corresponds to a dispersion computation of resistances for a node of a branch comprising at least two nodes. The best estimation is that obtained for all the nodes for all the branches. A preferred embodiment uses a set initial value which is dynamically adjusted (progressively) such as $$R_{S,n} = \sqrt{\frac{1}{N_{n-1} + \left(\sum_{k \in B_a, k \neq j} 1\right) - 1} \cdot \left(N_{n-1} \cdot R_{s,n-1} + \sum_{k \in B_a, k \neq j} (r_{k,j} - ETB_{a,j})^2\right)} \quad (17)$$

with a standard deviation count $$N_n = N_{n-1} + \left(\sum_{k \in B_a} 1\right) - 1, \quad N_0 = 1 \quad N_n = N_{n-1} + \left(\sum_{k \in B_a, k \neq j} 1\right) - 1 \quad (18)$$

and $R_{s,0}$ as value of the count parameter initially set, "n" being the summing step index of the standard deviations of the resistive terms common to a node for a same branch.

Certain optimization means of the estimation of the matrix are revealed in the application WO 2017/050847 (Léonard). A first additional means concerns the replacement of the derivative of voltage and of current in equation 2 by electrical measurements, derivative or not, on which a high-pass filter is applied. A derivative amounts, from a spectral point of view, to applying a filter which exhibits a constant increasing slope when illustrated on a log-log graph for the amplitude and the frequency respectively. The replacement of the derivative by a high-pass filter allows further using the information generated by random switchings which have apparent frequencies (once a day) located over the characteristic frequency of the peak twice a day. Apparent frequency here means a frequency perceived after sampling considering a spectral aliasing imposed by a transmission of the data integrated over a period of several minutes by a meter. The optimization means may be implemented upstream of any other estimation means of the ohmic matrix and provides on average better results on numerous cases.

A second additional means consists in iteratively removing, from the consumption data to be processed, quantities of current and of voltage drop modeled by initiating the process from a consumption point that has the best estimated corresponding matrix terms in the matrix towards the one that has the most imprecise terms. The iteration stops when a predetermined fraction of energy is removed, usually just over half of the energy. By removing the most active consumption points, the quieter ones may then express themselves. However, the process requires a computational effort which does not always pay off.

Figure 13:
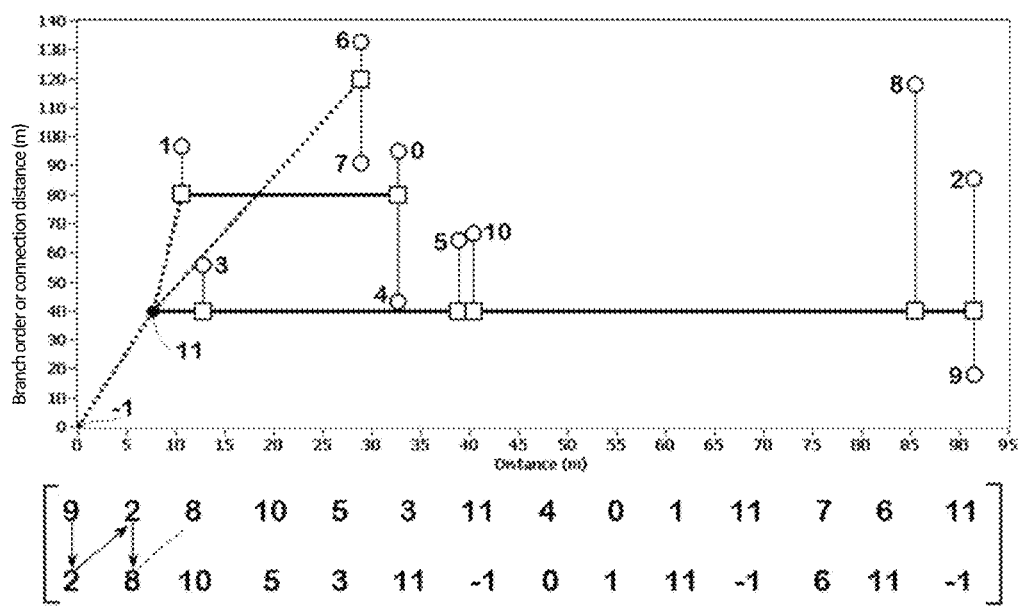
FIG. 13 is a graph illustrating a graphics rendering of results of a topology layout and cable segment lengths for an ohmic matrix similar to that of FIG. 6 and a tree table describing the topology.
Figure 17:
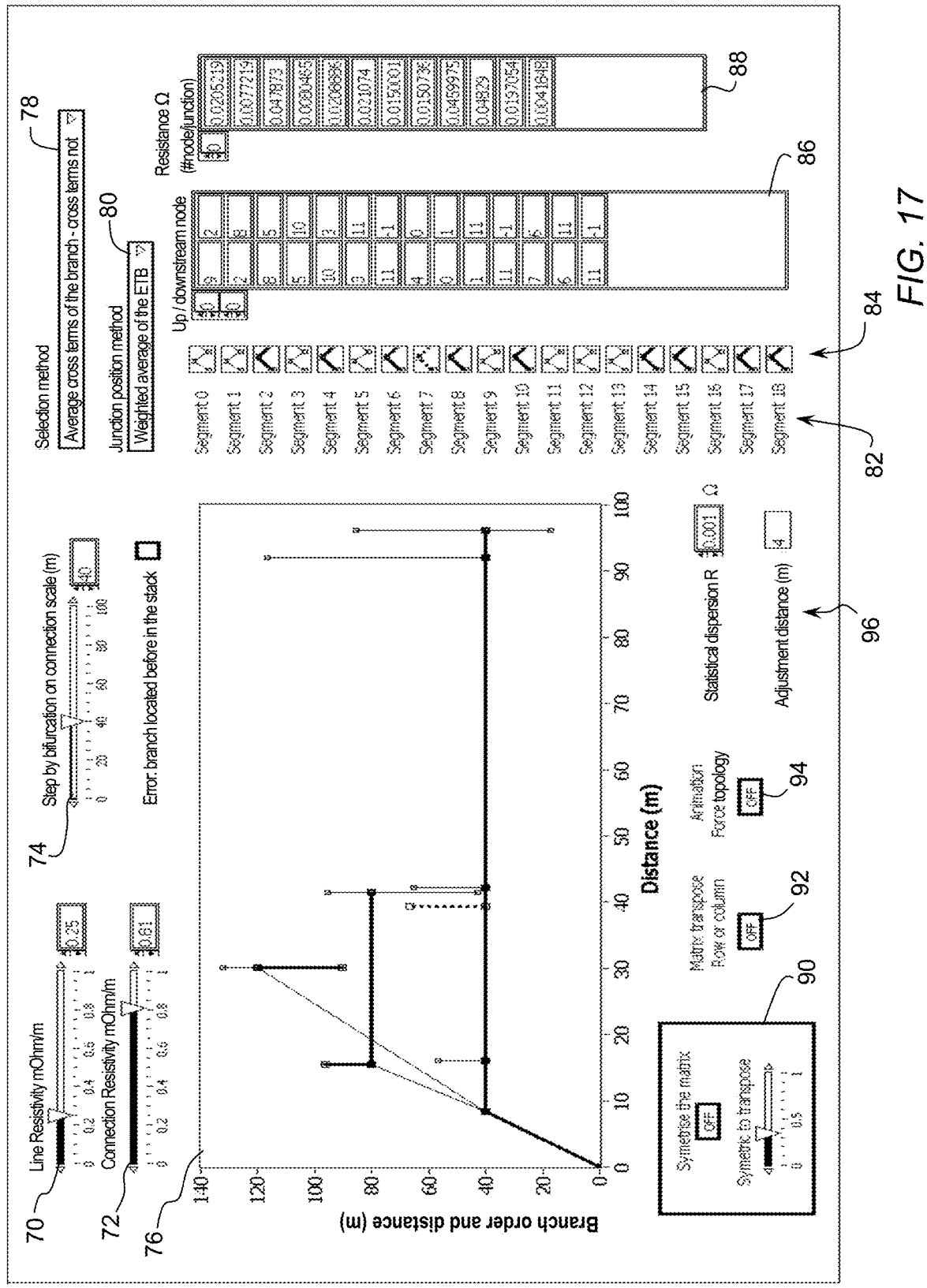
FIG. 17 is a schematic diagram illustrating an example of graphical user interface allowing an interaction between a system implementing the method according to the invention and a user.

Referring to FIG. 13, an example of topology table and of graphics rendering of the segment lengths of cables estimated with the method according to the invention is shown for a distribution network corresponding to the ohmic matrix of FIG. 6. Depending on the processing choice determining the ohmic matrix and also the choice of the interpretation method of the matrix (for example, a symmetrization of the matrix), the result may be slightly different. Among other things, a selection 90 in the visual interface (as shown in FIG. 17) allows choosing a linear compromise between the original matrix and the symmetrized matrix. The distribution line cables are shown in bold lines and the connection cables are shown in thin lines. Values of 0.25 mΩ and of 0.81 mΩ have been used as values of linear resistance per meter of these cables, corresponding respectively to 2/0 AWG and 4 AWG cables. In the example, two conductor formats are set, that is identical gauge conductors for the line and identical gauge conductors for the connections. In reality, if a conductor has a different gauge in the field, its graphically represented length will vary inversely to its real linear resistance or the one entered in the model. The oblique line sections have a value representative of their length in the projection of the line on the abscissa while in ordinate, it is a 40 m jump in this graphical example which is inserted to indicate the exploration order of the branch in the graph. In the case where the distribution network is partly or mainly underground, it may be very relevant to consider the aspect of the temperature of the conductors. From the point of view of an operator of the electrical network, the operator may wish to validate the layout plans of the network for a topological arrangement of the consumption sites (i.e. meters). A deviation between a layout plan and what is observed through another means in the field may be explained by an error in the plan, by an ENC or by an error of the comparison means used. The temperature of underground conductors is then an information useful for an optimal use of a network section shared by many consumption locations. Indeed, a problem in electrical distribution systems is a temperature rise with the load which, when it exceeds a prescribed limit, accelerates the aging of the insulators. This problem is greater for underground networks. When there has been no important load during a long period on a cable section, it may be reasonably assumed that the resistance of this section is the cold resistance referenced to a local temperature (building, garage, exterior, etc.). Such a situation occasionally occurs and the corresponding resistance may be retained as reference resistance for a given ambient temperature. When important load power transfers occur, from the rise of the resistance is determined a temperature rise to which a reference ambient temperature is added. In that way, a monitoring mechanism may determine if the estimated temperature of the cable exceeds that prescribed and may command an action. Referring also to FIGS. 1A and 1B, the temperature of the transformer 16 may advantageously be considered in the method according to the invention. Indeed, a temperature variation of the transformer 16 directly impacts the resistance value of the segment connecting the root 14 to the line 10 (first junction or first meter 17 depending on the case). An overloaded transformer may thus be detected and its residual life may be estimated from the resistance variations of this segment. In a modeling of the transformer 16, a comparison of the resistive variations with the total current of the line 10 allows determining the nature of the transformer 16 and also, knowing the nature of the transformer 16, detecting an energy theft difficult to observe otherwise.

Figure 14:
FIG. 14 is a geomatics representation of the topology of FIG. 13 in the form of an aerial view.

Referring to FIG. 14, there is shown an aerial view of the distribution network of FIG. 13, which may be produced from the geomatics data 32 (as shown in FIG. 2). The aerial view may take the form of a satellite view of a color map coming from an online cartography service. The aerial view does not include a connection distance corresponding to a height of a connection post with respect to a height of a meter. The root is located at 0 m on the graphics rendering whereas the low voltage transformer is most probably located a little to the left of the single junction 11 (e.g. typically 1 to 2 m from the "junction before transformer") in the distribution network of the example. In reality, the root may be very far away and it is not useful to represent it to scale in the graphics rendering.

In the example, the method begins the exploration with the first terminal node "9", followed with the co-terminal node "2" which is a city light. In this result, the nodes "6" and "7", corresponding to the branch "c" in the exploration order, are directly connected to the junction "11" while they appear connected to the branch "b" in FIG. 11C for educational purposes of introducing the junction "12" of branch to branch. The node "1" being connected near the "junction before transformer", with the uncertainty of the estimation of the ohmic matrix, it could have been located on the first branch, the second one or even have been directly connected to this junction. The meters 0, 6 and 9 exhibit a longer connection length in FIG. 14 than that determined by the interpretation of the ohmic matrix. These connections, due to their lengths, have a bigger cable gauge (possibly 2/0 AWG) which causes their lengths to be underestimated in the graphical presentation.

The meter connected to node "8" is an exception with its length determined by the ohmic matrix exceeding by more than 50% that observed on the aerial view. This may be explained by a small gauge cable. But in this example case, the client has a 200 A electrical entrance like most of the other clients. The gauge could be bigger due to the connection distance but not smaller. However, various indicators revealed in the application WO 2017/050448 (Léonard et al.) point towards a probable ENC for the meter of this client. Among other things, the voltage of the meter is abnormally low while the voltage variations measured at the meter are abnormally large for conditions where all the meters of the distribution network handle a low current. A full bypass of one of both conductors of the split-phase circuit may be suspected, so that the apparent resistance determined from the voltage variation over the current variation is doubled for a portion of the 250 V powered loads. In that case, it is possible that one of both half-phases coming out of the meter towards a breaker panel of the client be disconnected and replaced by a bypass connected upstream of the meter on the same half-phase. Since a minimum cable gauge is required for a connection, a conductor may appear shorter on the graphics rendering because it has a larger gauge but it cannot appear longer. An exaggerated length indicates the presence of a possible ENC.

The precision of the graphics rendering is in the order of a few meters, in a representative way of the uncertainty of the ohmic matrix used in the example. Based on a certain number of resolved networks, the results show that the precision of the ohmic matrix increases with a decrease of the measurement interval of the meters, with a magnitude of the variations of measured currents and a relative decrease of the correlations of the consumptions between meters. A meter that has a low consumption variation will have a poorer estimation of its connection length but, being "quiet", it will have a more precise position on the low voltage line because it will offer a better reading of the voltage drops caused by the consumption of the other meters.

Figure 15A:
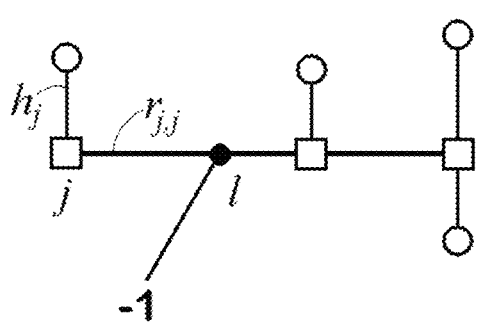
FIGS. 15A and 15B are schematic diagrams illustrating layouts of a node "j" depending on whether a distribution of connection resistances of a meter to a node and the node to a first junction before transformer are known (FIG. 15A) or not known (FIG. 15B illustrating a layout by default).
Figure 15B:
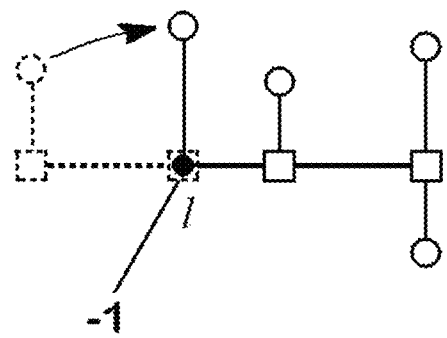

FIG. 15A shows a positioning of the node "j" if a resistance distribution between a connection resistance $h_j$ of the meter and a section of line resistance $r_{j,j}$ between the node of the meter and a first junction before transformer "l" is known. FIG. 15B shows a position by default allocated to the node. For the case where there is a single meter which connects on the junction "l" before the transformer, the position of the node "j" is unknown and this node is then superimposed at the junction before transformer. The given resistive value between the meter and the junction before transformer comprises the resistance value of the connection to the line $h_j$ and the resistance value of the line section $r_{j,j}$ between the connection node and the junction before the transformer. The position of the node being undetermined, the resistance distribution between these two values is unknown so that $r_{j,j}$ is set to zero and all the resistivity is set in $h_j$ connecting the meter to the first junction before the transformer. When the first meter of a branch is directly connected to the junction before transformer, it then appears that it is not possible to distinguish if this meter really shares this branch with the other meters or if it is located on a branch where it is alone.

According to an embodiment, the knowledge of a resistive value of a segment of line cable or of connection cable allows computing a nominal load drop corresponding to a nominal current prescribed in the standard which applies for a maximal allowable voltage drop and for a heating of the cables (for example the E.21-10 standard in Quebec or NF C 15-100 in France). In this way, an electrical network operator has a payload loss computation tool for a planning of his network, namely if an installation meets the standard or what changes need to be made for another use such as a contribution of a production source from a client formerly only a consumer. According to an embodiment, the resistances are translated in distances form the known gauges of the cables of the network and the distances are compared with geomatics data to detect anomalies. They may also be graphically displayed to allow a manual comparison. According to an embodiment, the topology table (for example as shown in FIGS. 12 and 13) is determined by a first computation and for the subsequent computations, only a length of the conductors is modified so as to, for example, be able to produce an animation. For example, if the subsequent computations are individually made for each hour of the day, the graphics rendering may be animated as a function of a 24-hour time circularity. A day/night alternate bypass manipulation will then be detectable by being perceived as a cyclic variation of the connection length at the manipulation site. For the example shown in FIG. 13, the meter "8" has a length that varies much more through time compared to the other meters. Another example resides in fixing the cable lengths and animating such that the resistance variation is explained by a temperature variation of the conductor. The temperature difference on the animated cable segment may be entered according to the weather, a daily cyclic variation, the season, or the temperature obtained from a weather station. The determination of the cable length may be achieved, for example, for an ohmic matrix corresponding to a given weather temperature or yet for an average of the lengths obtained according to the processed ohmic matrices with an average of temperatures corresponding to the matrices for correspondence. An automated monitoring process may compare a temperature rise of a cable with a predetermined threshold and if the threshold is exceeded, activate a network equipment to reduce a current in the cable to lower its temperature. Thus, the method according to the invention allows validating the topology of a distribution network with an action of reporting a meter to transformer allocation error, reporting a tree topology difference between that deduced from the measurements and that described in a geomatics database, reporting an abnormal magnitude difference of a segment of the tree possibly attributable to an ENC, or reporting a thermal anomaly in a given segment or at the transformer with or without a command to reduce the power flow in the segment or the transformer.

Figure 16:
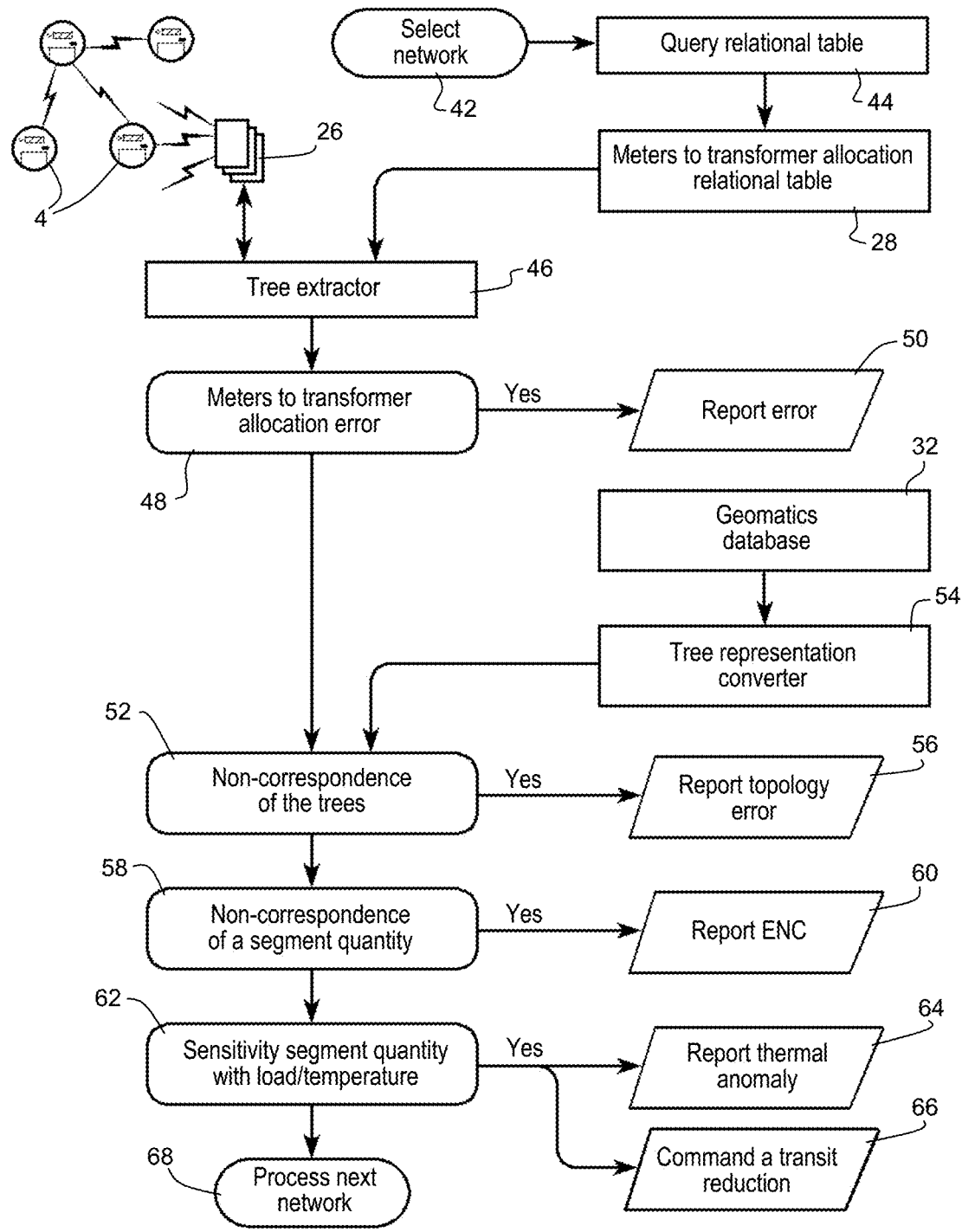
FIG. 16 is a schematic flowchart illustrating possible operations, system elements and actions in an implementation of the method according to the invention.

Referring to FIG. 16, an embodiment of the method according to the invention may proceed with an operation 42 for selecting a distribution network to reconstruct, then an operation 44 for querying the transformers to meters allocation relational table 28 in order to identify the meters of the selected distribution network. A tree extractor 46 advantageously implemented by the system shown in FIG. 2 then reconstructs the tree of the distribution network. To this end, the tree extractor 46 extracts the data indicative of the consumption measurements 26 of the meters 4 allocated to the selected distribution network, generates the ohmic matrix according to the data then reconstructs the tree of the distribution network and determines the magnitudes of the segments of the tree according to the processes of the method described hereinabove. An operation 48 may then be carried out to validate the allocation of the meters to the transformer, with a possible action 50 of reporting an allocation error if applicable. Another operation 52 may also be carried out to validate the correspondence of the tree with that deduced from the consumption measurements 26 and that stored in the geomatics database 32 and formatted by a tree representation converter 54 so that the formats and structures of the data are compatible and comparable, with a possible action 56 of reporting a topology difference. Another operation 58 may be carried out to detect an abnormal magnitude difference of a segment in the tree, with a possible action 60 of reporting an ENC if applicable. Another operation 62 may also be carried out to determine a sensitivity of each segment as a function of the load for a given temperature range, with a possible action 64 of reporting a thermal anomaly for a given segment, with or without an action 66 to command a power flow reduction in the given segment. An operation 68 may be carried out so that another network is next processed by the method.

The tree extractor 46 thus determines the ohmic matrix representative of a tree-type distribution network model for extracting the corresponding topology, that is the topological layout (line junction and sequencing of the connections) and the cable segment lengths in this layout. The dimension of the ohmic matrix is of I nodes by I nodes, where a node may be, for example, a point of consumption measured by a smart meter. The method allows in particular to allocate a branch to each node, to position the junctions between the different branches and to quantify the position of each element in terms of resistive value or in terms of distance if the linear resistances of the conductors are known. The segment magnitude may mean a resistive value, a complex impedance or a cable length. As a given application, an aberrant position may be indicative of a meter to transformer allocation error or of an ENC. A correspondence with a geomatics plot may allow increasing an anomaly detection sensitivity. The comparison of the topology obtained at different time periods or at different load levels for a same distribution network allows visualizing an ENC or yet an influence of the load on the resistance of the cable segments. The knowledge of the resistive value of each segment of line cable or connection cable allows computing a nominal load loss and validating if the installation complies with the standard. The comparison may, for example, be visual using an animation as mentioned hereinabove or automated with a continuous monitoring of a threshold overrun. It is also of interest to determine a temperature variation of a cable segment by considering that its length is fixed and that its resistance is a function of the temperature, in which case an automated system may command equipment of the network as a function of a temperature difference observed on a line segment.

Figure 11C:
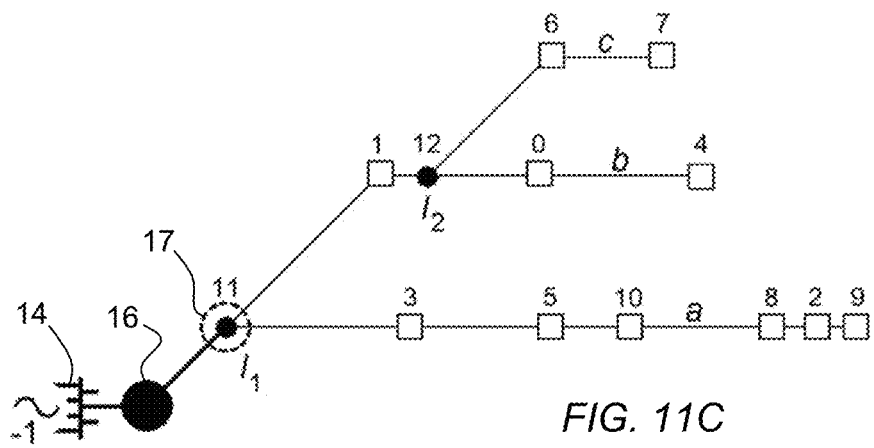

Referring to FIG. 17, there is shown an example of graphical user interface (GUI) implemented in a system according to the invention, having interactive components of command and control of sequences and parameters of the method. The GUI allows among other things to visualize various information generated and produced by the method, and to interact with detection functions of ENC implemented according to the method, as well as to set or adjust threshold values for triggering alarms or other actions as described hereinabove. In the illustrated GUI example, slide controls 70, 72, 74 allow respectively adjusting values of resistivity of a line, of a connection, and a step by bifurcation to use in the graph 76 illustrating the tree of the distribution network reconstructed by the method according to the invention. Dropdown menus 78, 80 allow selecting the methods of selection of a branch and of positioning of a junction. A list 82 of the segments of the reconstructed distribution network may be displayed along with icons 84 indicative of the segment types. The tree table 86 may also be displayed, as well as a table 88 showing resistances of the nodes to the corresponding junctions. Various other controls may be displayed in the GUI, for example to perform operations on the ohmic matrix as in the frame 90 and the switch button 92, for triggering an animation by a switch button 94, or for entering and displaying parameter values applied in the processes of the method. A visualization of the ohmic matrix as shown in FIGS. 6, 11A and 11B or in the form of a table of the values of the matrix, of a graphics rendering as shown in FIG. 14, or other graphs as shown in FIGS. 11C, 12 and 13 may also be generated in another GUI window (not shown).

The present invention thus provides an advantageous tool to better manage an electrical distribution network.

Although the method according to the invention described above refers to several equations, it must be understood that the equations in question describe and define steps, sequences, systems, algorithms or forms of algorithms which, when implemented in and by a computer or a computer system, form a concrete embodiment of the invention. While embodiments of the invention have been illustrated in the accompanying drawings and described above, it will be evident to those skilled in the art that modifications may be made therein without departing from the invention.

The invention claimed is:

1. Computer-implemented method for reconstructing a topology of an electrical distribution network having nodes to which smart meters are connected, the method comprising the steps of:
(i) generating an ohmic matrix model of the distribution network as a function of consumption measurements provided by the smart meters, the ohmic matrix model having matrix terms indicative of resistive quantities between the nodes and a root to which a distribution transformer of the distribution network is connected;
(ii) defining a tree table of the nodes; and
(iii) by Sequences of decreasing values derived from the resistive quantities of the ohmic matrix model and iteratively for the nodes to enter in the tree table:
  (a) defining a new branch as branch in exploration in the tree table;
  (b) entering a node having the highest resistive quantity as terminal node of the branch in exploration in the tree table; and
  (c) entering in the tree table, in successive upstream positions from one another towards the root, all the nodes other than the terminal node meeting preestablished decision criteria as a function of connection values derived from the resistive quantities and, as other nodes are progressively entered for the branch in exploration, with said other nodes, one of the preestablished decision criteria determining a junction of a last node entered in the tree table with a branch already explored depending on whether the resistive quantity of the last node corresponds, within a preset sensitivity margin, to a node of an explored branch or to a position between two nodes of a branch already explored, another one of the preestablished decision criteria determining a connection of the last node to the root;
the topology of the distribution network being reconstructed when all the nodes are associated with a branch in the tree table and at least one node or a junction is connected to the root; and
remotely controlling equipment of the distribution network to ensure safe operation of the electrical distribution network.

2. The method according to claim 1, wherein each junction has a resistive quantity determined by an average of the resistive quantities of inter-terms in the ohmic matrix model corresponding to the nodes of the other branches connected to the junction.

3. The method according to claim 1, further comprising the step of creating a junction in the tree table downstream of the root grouping all the branches that have a node in connection position with the root depending on whether more than a branch has such a node in the reconstructed topology so that a single resistive segment connects the root to a junction.

4. The method according to claim 1, further comprising the steps of:
detecting an aberrant position or an aberrant resistive quantity of a node in the tree table by comparison of the connection value of the node with the connection values of the other nodes and with a gauge of limit values; and
generating a potential meter to transformer allocation error signal indicating the smart meter corresponding to the aberrant position.

5. The method according to claim 1, further comprising the steps of:
comparing the tree table of the reconstructed distribution network with a former tree table of the distribution network for detecting a topology difference exceeding a preset threshold; and
generating a topology difference signal according to the detected topology difference.

6. The method according to claim 2, further comprising the steps of:

evaluating distances between the nodes and junctions according to the resistive quantities as a function of predefined resistivities of cables connecting the nodes and junctions to one another in the distribution network;

comparing the distances with geomatics data describing the distribution network for detecting distance differences; and generating a signal indicative of the detected distance differences.

7. The method according to claim 2, further comprising the steps of:

evaluating distances between nodes, junctions, smart meters and transformer according to the resistive values as a function of predefined resistivities of cables connecting the smart meters to the nodes and the nodes, junctions and transformer to one another in the distribution network; and generating a graph in which the nodes, junctions, smart meters and transformer of the reconstructed topology are positioned and connected by cable segments according to their respective positions in the branches of the reconstructed topology and the evaluated distances.

8. The method according to claim 1, further comprising the step of determining a variation of a resistance of a segment of the topology as a function of resistive values obtained for ohmic matrix models generated as a function of the consumption measurements provided by the smart meters during different time periods.

9. The method according to claim 8, further comprising the step of generating an animated graph in which the nodes, junctions, smart meters and transformer of the reconstructed topology are positioned and connected by cable segments according to their respective positions in the branches of the reconstructed topology and distances varying according to each variation of resistance and predefined cable gauges for the cable segments.

10. The method according to claim 8, further comprising the step of determining temperatures as a function of the resistance.

11. The method according to claim 8, further comprising the steps of:

monitoring the variation of the resistance of the segment of the topology connecting the distribution network to the root; and detecting an overload or a nature of the distribution transformer or detecting an energy theft in the distribution network by comparison of the variation of the resistance of said segment with a total current in said segment.

12. The method according to claim 8, further comprising the steps of:

converting the resistance of the segment into thermal value of said segment; and generating an action signal for current reduction in the segment depending on whether the thermal value exceeds a preset thermal threshold.

13. System for reconstructing a topology of an electrical distribution network having nodes to which smart meters are connected, the system comprising:

a processing unit having a processor and a memory in communication with the processor, the memory containing instructions which, when executed by the processor, cause the processor to perform the steps of:

(i) generating an ohmic matrix model of the distribution network as a function of consumption measurements provided by the smart meters, the ohmic matrix model having matrix terms indicative of resistive quantities between the nodes and a root to which a distribution transformer of the distribution network is connected;

(ii) defining a tree table of the nodes; and (iii) by Sequences of decreasing values derived from the resistive quantities of the ohmic matrix model and iteratively for the nodes to enter in the tree table:

(a) defining a new branch as branch in exploration in the tree table;

(b) entering a node having the highest resistive quantity as terminal node of the branch in exploration in the tree table; and (c) entering in the tree table, in successive upstream positions from one another towards the root, all the nodes other than the terminal node meeting preestablished decision criteria as a function of connection values derived from the resistive quantities and, as other nodes are progressively entered for the branch in exploration, with said other nodes, one of the preestablished decision criteria determining a junction of a last node entered in the tree table with a branch already explored depending on whether the resistive quantity of the last node corresponds, within a preset sensitivity margin, to a node of an explored branch or to a position between two nodes of a branch already explored, another one of the preestablished decision criteria determining a connection of the last node to the root;

the topology of the distribution network being reconstructed when all the nodes are associated with a branch in the tree table and at least one node or a junction is connected to the root; and remotely controlling equipment of the distribution network to ensure safe operation of the electrical distribution network.

14. The system according to claim 13, further comprising a screen connected to the processing unit, the instructions comprising instructions causing the processor to display on the screen a graphical user interface having interactive components of command and control of sequences and parameters of the steps performed by the system.

15. Tangible and non-transitory computer program product for reconstructing a topology of an electrical distribution network having nodes to which smart meters are connected, the product containing instructions which, when executed by a processor, cause the processor to perform the steps of:

(i) generating an ohmic matrix model of the distribution network as a function of consumption measurements provided by the smart meters, the ohmic matrix model having matrix terms indicative of resistive quantities between the nodes and a root to which a distribution transformer of the distribution network is connected;

(ii) defining a tree table of the nodes; and (iii) by Sequences of decreasing values derived from the resistive quantities of the ohmic matrix model and iteratively for the nodes to enter in the tree table:

(a) defining a new branch as branch in exploration in the tree table;

(b) entering a node having the highest resistive quantity as terminal node of the branch in exploration in the tree table; and (c) entering in the tree table, in successive upstream positions from one another towards the root, all the nodes other than the terminal node meeting preestablished decision criteria as a function of connection values derived from the 30 s resistive quantities and, as other nodes are progressively entered for the branch in exploration, with said other nodes, one of the preestablished decision criteria determining a junction of a last node entered in the tree table with a branch already explored depending on whether the resistive quantity of the last node corresponds, within a preset sensitivity margin, to a node of an explored branch or to a position between two nodes of a branch already explored, another one of the preestablished decision criteria determining a connection of the last node to the root;

the topology of the distribution network being reconstructed when all the nodes are associated with a branch in the tree table and at least one node or a junction is connected to the root; and remotely controlling equipment of the distribution network to ensure safe operation of the electrical distribution network.

* * * * *